US011756239B2

(12) United States Patent
Aggarwal et al.

(10) Patent No.: US 11,756,239 B2
(45) Date of Patent: Sep. 12, 2023

(54) MULTI-MODAL IMAGE COLOR SEGMENTER AND EDITOR

(71) Applicant: ADOBE INC., San Jose, CA (US)

(72) Inventors: Pranav Aggarwal, San Jose, CA (US); Ajinkya Kale, San Jose, CA (US)

(73) Assignee: ADOBE, INC., San Jose, CA (US)

( * ) Notice: Subject to any disclaimer, the term of this patent is extended or adjusted under 35 U.S.C. 154(b) by 311 days.

(21) Appl. No.: 17/240,030

(22) Filed: Apr. 26, 2021

(65) Prior Publication Data

US 2022/0343561 A1 Oct. 27, 2022

(51) Int. Cl.
*G06T 11/00* (2006.01)
*G06T 7/90* (2017.01)
*G06T 7/11* (2017.01)

(52) U.S. Cl.
CPC .............. *G06T 11/001* (2013.01); *G06T 7/11* (2017.01); *G06T 7/90* (2017.01)

(58) Field of Classification Search
CPC ............ G06T 11/001; G06T 7/11; G06T 7/90
USPC ......................................................... 382/167
See application file for complete search history.

(56) References Cited

U.S. PATENT DOCUMENTS

| | | | | |
|---|---|---|---|---|
| 11,615,567 B2* | 3/2023 | Harikumar | ............. | G06V 20/60 382/173 |
| 2015/0104183 A1* | 4/2015 | Jeffrey | ............. | H04N 21/44008 398/130 |
| 2015/0324392 A1* | 11/2015 | Becker | ............. | G06F 16/24578 707/706 |
| 2016/0140519 A1 | 5/2016 | Trepca et al. | | |
| 2019/0294641 A1 | 9/2019 | Alexeev et al. | | |
| 2020/0380027 A1 | 12/2020 | Aggarwal et al. | | |
| 2020/0380298 A1* | 12/2020 | Aggarwal | .......... | G06V 30/1916 |
| 2020/0380403 A1 | 12/2020 | Aggarwal et al. | | |
| 2021/0089827 A1 | 3/2021 | Kumagai et al. | | |

OTHER PUBLICATIONS

Office Action dated Sep. 22, 2022 in related U.S. Appl. No. 17/186,625.
Artetxe, et al., "Massively Multilingual Sentence Embeddings for Zero-Shot Cross-Lingual Transfer and Beyond", arXiv:1812.10464v2 [cs.CL] Sep. 25, 2019, 14 pages.
Related to U.S. Appl. No. 16/561,973, filed Sep. 5, 2019, entitled: Multi-Resolution Color-Based Image Search.

(Continued)

*Primary Examiner* — Gabriel I Garcia
(74) *Attorney, Agent, or Firm* — F. CHAU & ASSOCIATES, LLC

(57) ABSTRACT

Systems and methods for color replacement are described. Embodiments of the disclosure include a color replacement system that adjusts an image based on a user-input source color and target color. For example, the source color may be replaced with the target color throughout the entire image. In some embodiments, a user provides a speech or text input that identifies a source color to be replaced. The user may then provide a speech or text input identifying the target color, replacing the source color. A color replacement system creates and embedding of the source color, segments the image based on the source color embedding, and then replaces the color of segmented portion of the image with the target color.

20 Claims, 9 Drawing Sheets

(56) References Cited

OTHER PUBLICATIONS

Related to U.S. Appl. No. 17/075,450, filed Oct. 20, 2020, entitled: Generating Embeddings In A Multimodal Embedding Space For Cross-Lingual Digital Image Retrieval.
Yang, et al., "Multilingual Universal Sentence Encoder for Semantic Retrieval",2019, arXiv preprint arXiv:1907.04307v1 [cs.CL] Jul. 9, 2019, 6 pages.
Office Action dated May 30, 2023 in corresponding U.S. Appl. No. 17/186,625.

* cited by examiner

MULTI-MODAL IMAGE COLOR SEGMENTER AND EDITOR

BACKGROUND

The following relates generally to image editing, and more specifically to color replacement.

Image editing refers to the process of adjusting an image, digitally or otherwise, to modify the appearance of the image. For example, computer-based image editing software provides the ability to modify images quickly and efficiently. In some cases, digital images may be edited using a non-destructive editing process.

Color replacement refers to the process of changing one color of an image to another color. Conventionally, color replacement involves either manually selecting pixels having a given color or selecting an RGB representation of a color and identifying pixels in the image having the same or similar RGB values.

However, manually selecting pixels to replace is time consuming and inaccurate. Selecting colors based on RGB values can also result in inaccurate selection because the distance between colors in the RGB space does not necessarily correspond to human color perception. Furthermore, many users find it difficult to select a desired set of colors by specifying RGB values. Therefore, there is a need in the art for improved systems and methods for color replacement that can efficiently select and replace a desired color with another color in an image.

SUMMARY

The present disclosure describes systems and methods for color replacement. Embodiments of the disclosure include a color replacement system that adjusts an image based on a user-input source color and target color. For example, the source color may be replaced with the target color throughout the entire image. In some embodiments, a user provides a speech or text input that identifies a source color to be replaced. The user may then provide a speech or text input identifying the target color for replacing the source color. A color replacement system creates an embedding of the source color, segments the image based on the source color embedding, and then replaces the color of segmented portion of the image with the target color.

A method, apparatus, non-transitory computer readable medium, and system for color replacement are described. One or more embodiments of the method, apparatus, non-transitory computer readable medium, and system include generating color embeddings for a plurality of pixels of an image using a color encoder; identifying a source color embedding corresponding to a source color within the image; segmenting the image to produce a color segmentation by comparing the source color embedding to the pixel color embeddings, wherein the color segmentation indicates a portion of the image that corresponds to the source color; receiving a target color input corresponding to a target color; generating a target color embedding by applying a color text embedding network to the target color input; identifying the target color based on the target color embedding; and replacing the source color with the target color in the image based on the color segmentation and the target color embedding.

A method, apparatus, non-transitory computer readable medium, and system for color replacement are described. One or more embodiments of the method, apparatus, non-transitory computer readable medium, and system include receiving an image, a source color input identifying a source color, and a target color input identifying a target color; generating a source color embedding for the source color based on the source color input; generating color pixel embeddings for a plurality of pixels in the image; segmenting the image to produce a color segmentation by comparing the source color embedding to the pixel color embeddings; generating a target color embedding based on the target color input; identifying a target color representation for the target color; and replacing the source color with the target color in the image based on the color segmentation and the target color representation.

An apparatus, system, and method for color replacement are described. One or more embodiments of the apparatus, system, and method include an a color text embedding network configured to generate a source color embedding based on a source color input and a target color embedding based on a target color input; a color encoder configured to generate pixel color embeddings for a plurality of pixels in an image; an image segmentation component configured to segment the image to produce a color segmentation by comparing the source color embedding to the pixel color embeddings; and a color replacement component configured to replace the source color with the target color in the image based on the color segmentation and the target color embedding.

DETAILED DESCRIPTION

Figure 1:
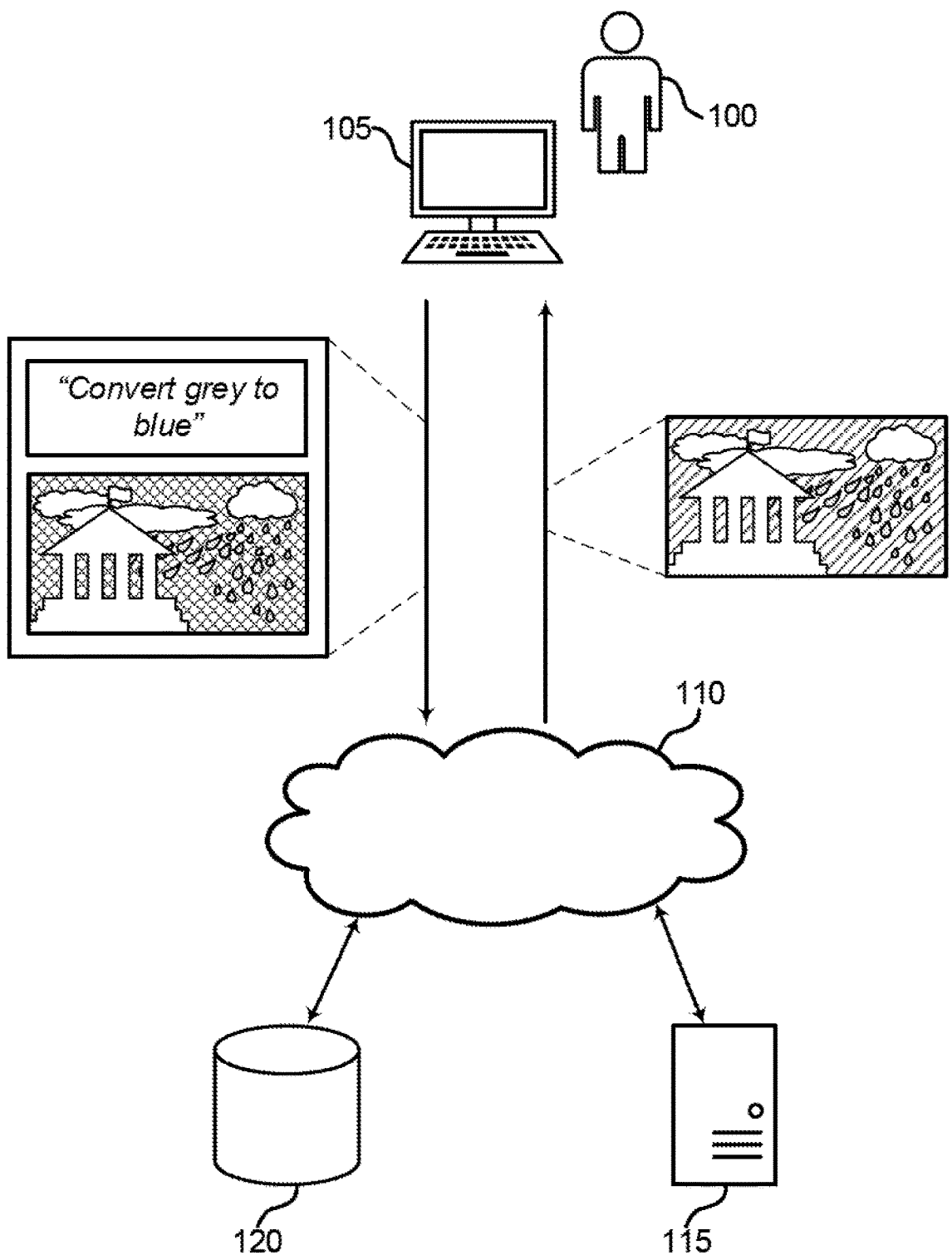
FIG. 1 shows an example of a color replacement diagram according to aspects of the present disclosure.

The present disclosure describes systems and methods for color replacement. Embodiments of the disclosure include a color replacement system that adjusts an image based on a user-input source color and target color. For example, the source color may be replaced with the target color throughout the entire image. In some embodiments, a user provides a speech or text input that identifies a source color to be replaced as well as a target color for replacing the source color. A color replacement system creates an embedding of the source color, segments the image based on the source color embedding, and then replaces the color of segmented portion of the image with the target color. In some examples, the source color is replaced with the target color throughout the entire image, providing the ability for a user to quickly and efficiently adjust the colors of an image.

An image can contain hundreds or thousands of distinct colors. These colors may be located at numerous locations in the image itself. For example, an image of a tree may have thousands of leaves. If a designer wants to change the color of only the leaves, they may be required to edit each leaf individually. This process can be very time-consuming and may lead to errors in the final product.

Conventional image editing software performs color replacement by either allowing users to manually select pixels having a given color or by selecting an RGB representation of a color and identifying pixels in the image having the same or similar RGB values. However, manually selecting pixels to replace is time-consuming and inaccurate. Selecting colors based on RGB values can also result in inaccurate selection because the distance between colors in the RGB space does not necessarily correspond to human color perception. Furthermore, many users find it difficult to select a desired set of colors by specifying RGB values.

Embodiments of the present disclosure provide a system to replace a source color with a target color by receiving natural language inputs identifying the source color, the target color, or both. In some embodiments, colors may be input to a speech-to-text program. A color text embedding network embeds the text input to create a color embedding for the source color, while the colors of individual pixels are also embedded in the same color embedding space using a color encoder. Pixels having the same or similar color to the source color are identified based on the color embeddings and replaced with the target color.

By applying the unconventional step of performing color replacement based on natural language color inputs, embodiments of the present disclosure enable image editing software to perform fast and accurate color replacement without relying on manual pixel selection or RGB color selection. Furthermore, embodiments of the present disclosure can replace colors in an image while retaining variations in shade (e.g., due to differences in saturation or luminance).

Embodiments of the present disclosure may be used in the context of an image editing software application. For example, a color replacement apparatus based on the present disclosure may receive natural language speech or text as input, and efficiently segment and replace the colors of an image based on the input speech or text. An example of an application of the inventive concept in the image editing context is provided with reference to FIGS. 1 through 3. Details regarding the architecture of an example color replacement apparatus are provided with reference to FIGS. 4 and 5. Examples of a process for color replacement are provided with reference to FIGS. 6 through 9.

Color Replacement System

FIG. 1 shows an example of a color replacement diagram according to aspects of the present disclosure. The example shown includes user 100, user device 105, cloud 110, color replacement apparatus 115, and database 120.

The present disclosure describes systems and methods to change a background of an image with a user-presented color (i.e., in the form of text or speech). For example, a user may rapidly replace colors in an image editing application, or visualize e-commerce products in different colors, while retaining color shade variations.

The process of manually identifying regions of an image with similar color shades is complex and time-consuming. However, embodiments of the present disclosure enable a user to say or enter a color text, and then segment the image based on the color text. The color text may be in multiple languages, may include spelling errors, or may refer to complex colors with specific shades (e.g., bluish-red). Embodiments of the present disclosure do not rely on object masks. This enables multiple objects of the same to color to be selected simultaneously. Embodiments of the present disclosure increase user interaction by making use of speech or text to provide colors and instructions to the tool.

In the example of FIG. 1, an image may contain an undesirable background color. In this case, the image was taken on a rainy day, and the sky is grey. A blue-colored sky would be more desirable for an aesthetically pleasing image. The user may input the image and say a phrase such as "convert grey to blue". The system will recognize the grey pixels of the image and convert the identified pixels to blue.

The user 100 communicates with the color replacement apparatus 115 via the user device 105 and the cloud 110. For example, the user 100 may provide an image and a source color to be replaced, as well as a target color for replacement. In some examples, the image may be retrieved from a database 120. As illustrated in FIG. 1, the source color and the target color may be identified from a single input phrase. In the example illustrated in FIG. 1, the image includes a building on a rainy day. The user device 105 transmits the source color text and the target color text to the color replacement apparatus 115. In some examples, the user device 105 communicates with the color replacement apparatus 115 via the cloud 110.

According to some embodiments, user device 105 presents candidate image colors to the user 100, so that the user 100 can select the source color from a list of colors that appear in the image. In some examples, user device 105 displays the color segmentation to a user 100. In some examples, user device 105 receives feedback from the user 100 for the color segmentation. In some examples, user device 105 displays a color palette to the user 100 based on the source color or the target color (i.e., to give the user a sense of the range of colors that will be replaced). In some examples, user device 105 receives a lightness value and a saturation value so that the user can fine-tune the shade of color or colors used to replace the source color.

The user device 105 may be a personal computer, laptop computer, mainframe computer, palmtop computer, personal assistant, mobile device, or any other suitable processing apparatus. The user device 105 is an example of, or includes aspects of, the corresponding element described with reference to FIG. 4.

A cloud 110 is a computer network configured to provide on-demand availability of computer system resources, such as data storage and computing power. In some examples, the cloud 110 provides resources without active management by the user 100. The term cloud 110 is sometimes used to describe data centers available to many a user 100 over the Internet. Some large cloud 110 networks have functions distributed over multiple locations from central servers. A server is designated an edge server if it has a direct or close connection to a user 100. In some cases, a cloud 110 is limited to a single organization. In other examples, the cloud 110 is available to many organizations. In one example, a cloud 110 includes a multi-layer communications network comprising multiple edge routers and core routers. In another example, a cloud 110 is based on a local collection of switches in a single physical location.

The color replacement apparatus 115 performs color segmentation and color replacement on an image. In some cases, the color replacement apparatus 115 may receive natural language speech or text as input, and segment then replace the colors of an image based on the input speech or text. An encoder may be used to convert color text to a corresponding color embedding, which is in the same space as the pixel color embeddings. Color replacement apparatus 115 is an example of, or includes aspects of, the corresponding element described with reference to FIG. 4.

A database 120 is an organized collection of data. For example, a database 120 stores data in a specified format known as a schema. A database 120 may be structured as a single database 120, a distributed database 120, multiple distributed databases 120, or an emergency backup database 120. In some cases, a database 120 controller may manage data storage and processing in a database 120. In some cases, a user 100 interacts with database 120 controller. In other cases, database 120 controller may operate automatically without user 100 interaction.

Figure 2:
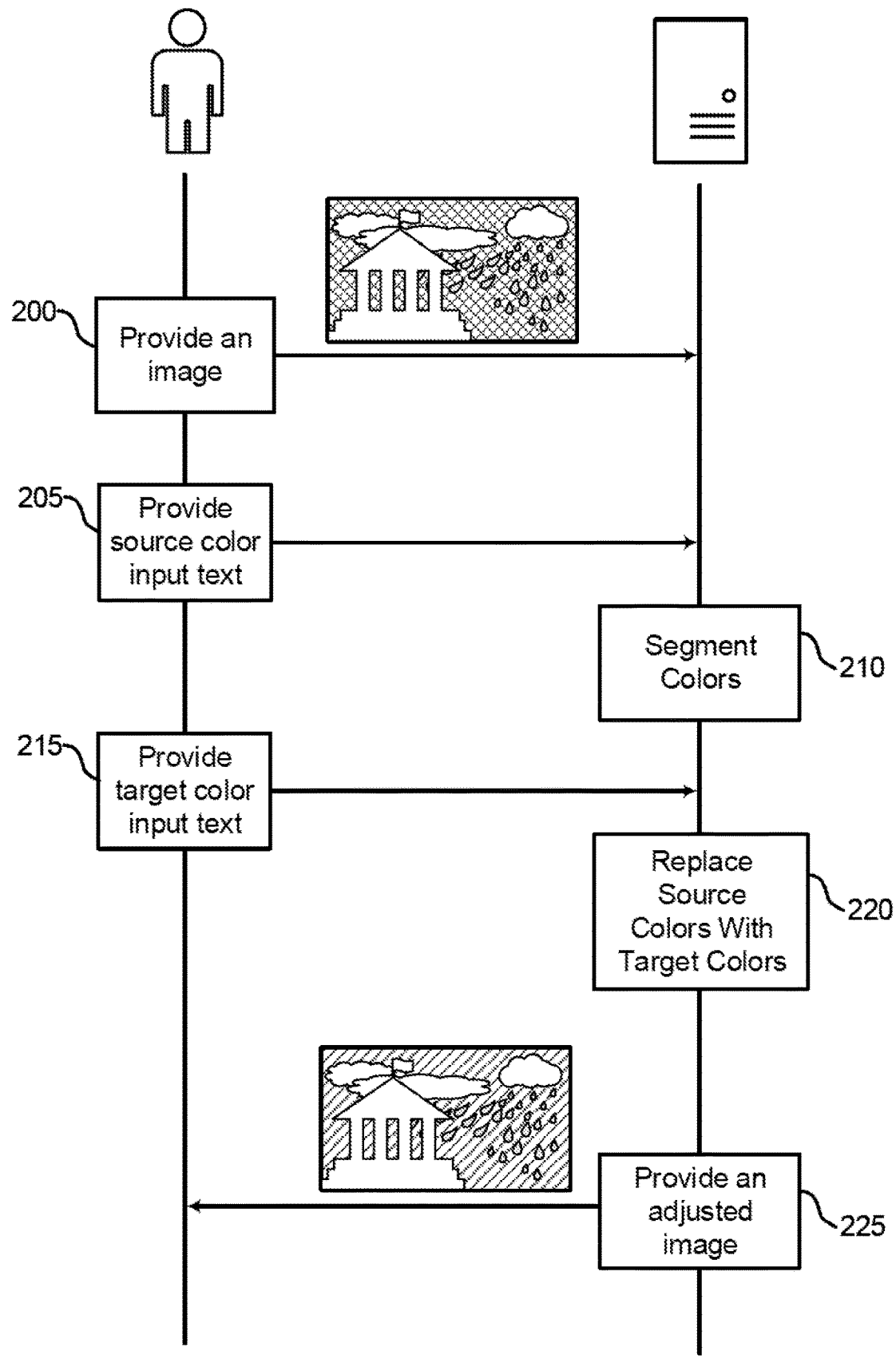
FIG. 2 shows an example of a color replacement process according to aspects of the present disclosure.

FIG. 2 shows an example of a color replacement process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Some embodiments of the present disclosure provide the ability for a user to segment regions from an image based on color texts and replace with another color text (i.e., shades and lightness of the segmented region are unchanged). In some embodiments, the color embeddings used are histogram-based vectors. Therefore, elements in the embedding represent color shades. A slider is provided which may decide the range of shades of a color (therefore adjusting the dominance of the color) while segmenting regions based on color embedding similarity scores of a region pixel with color embedding of the text color. A user adjusts saturation and lightness of the replaced color regions as the hue part of a color is replaced. Speech may be used to increase saturation and lightness of the replaced color, size of the color regions to segment and provide semantic segmentation areas. Some embodiments of the present disclosure provide a theme editor tool that uses dominant colors in an image and replaces with colors of user-provided color theme to get different images in the same color theme faster.

At operation 200, the user provides an image to the system. The image may be any file format such as JPEG, RAW, HEIC, or the like. Alternatively, an image may be located in a database and may be provided to the system by the user. In some cases, the operations of this step refer to, or may be performed by, a user as described with reference to FIG. 1.

At operation 205, the user provides a speech or text input with a source color. The speech input is provided to a multi-lingual text encoder to convert text into a color embedding. The system of the present disclosure can be input with any natural language color. For example, the user may input red, rojo, rossa, or rouge. A text input may also be provided to the system in the form of natural language text from a keyboard, mouse, touchpad, or the like. The source color may be a user-defined color that will be replaced.

At operation 210, the system segments the colors in the image. The color segmentation is performed by extracting color embeddings for the unique pixels in an image using the color pixel encoder. A user may search colors using a color auto-tagger. The auto-tagger recommends colors in the form of text, based on colors that are present in an image. A user may consider any color to segment in the natural language spectrum. In some cases, the operations of this step refer to, or may be performed by, a color replacement apparatus as described with reference to FIGS. 1 and 4.

At operation 215, the user provides a speech or text input with a target color. The speech input is provided to a multi-lingual text encoder to convert text into a color embedding. A text input may also be provided to the system in the form of natural language text from a keyboard, mouse, touchpad, or the like. The target color may be a user-defined color that will replace the source color.

At operation 220, the system replaces the source color with the target color to create an adjusted image. Different lighting and shadows in the images are preserved when the hue part of a pixel's hue, saturation, and lightness (HSL) value is replaced. Some embodiments of the present disclosure are used for style editing for real-world images where distinct colors are present. The user may say a color to segment the portions and then use a color text (i.e., basic, complex or specific colors) to replace the segmented regions. Some embodiments of the present disclosure are used to do palette mapping (i.e., map multiple painting colors to a different set of colors and transfer the original image according to color texts provided by a user). A user may adjust the saturation and lightness of the replaced color regions as the hue part of a color is replaced. In some cases, the operations of this step refer to, or may be performed by, a color replacement apparatus as described with reference to FIGS. 1 and 4.

In some embodiments, when replacing a color, the hue dimension may be replaced, while retaining variations in shades and lightness of a color in the masked portion of the image. For example, a user may be provided with controls to adjust portions of the image based on color dominance and control the saturation (shade) and lightness of the replacing colors. Some embodiments of the present disclosure use an auto-tagger, which suggests color tags for a given image for color segmentation by a user with increased accuracy. The input to the developed model is text. Therefore, a user uses a speech-to-text tool to give instruction (by speech) with colors to be segmented and replaced. A user may use speech to increase saturation and lightness of the replaced color and provide semantic segmentation areas.

At operation 225, the adjusted image is sent back to the user. The user may save the adjusted image after being satisfied with the changes of a color-segmented portion. The process may also be repeated for a different color or for a different image.

Figure 3:
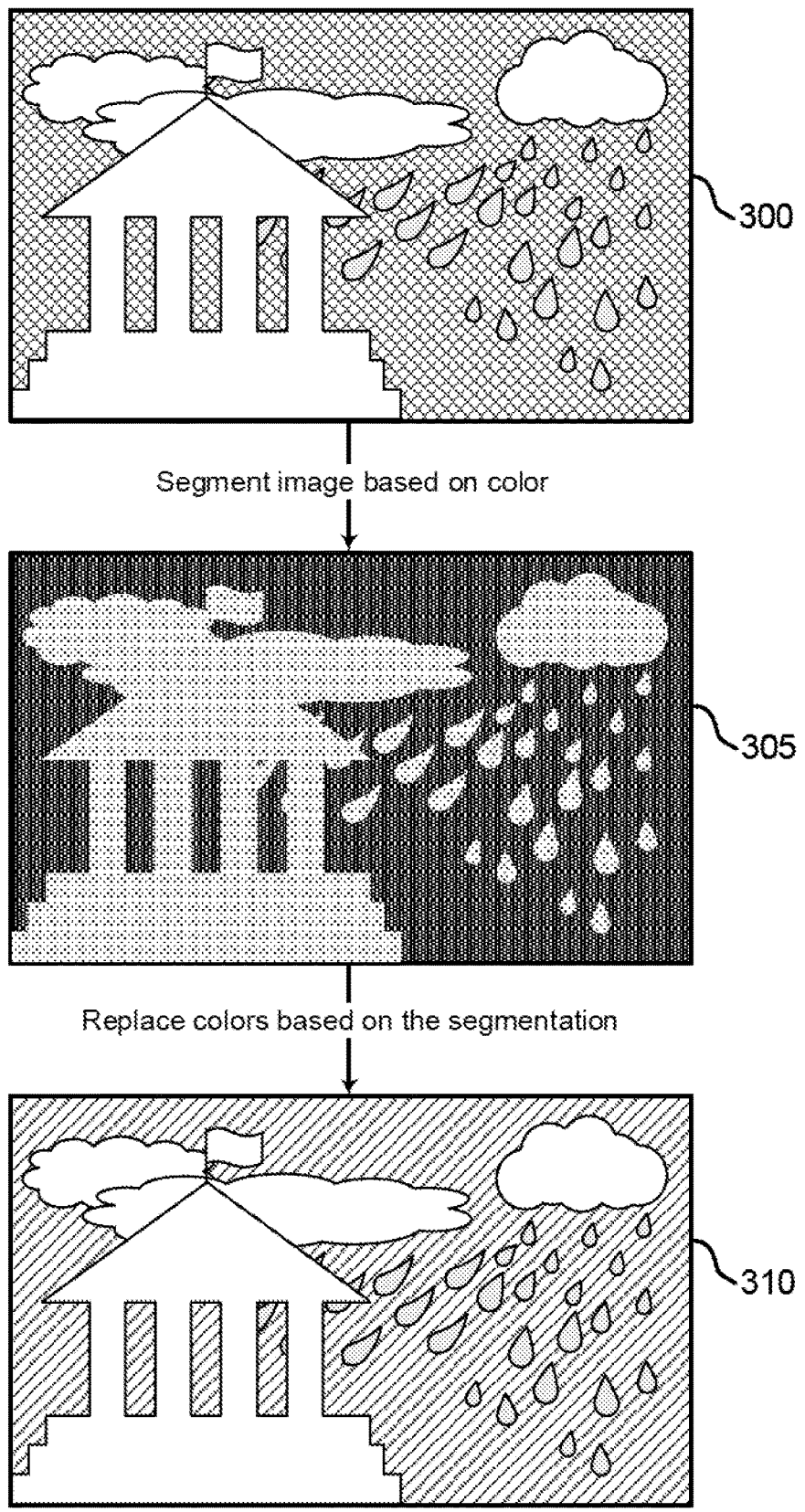
FIG. 3 shows an example of a color replaced image according to aspects of the present disclosure.

FIG. 3 shows an example of a color replaced image 310 according to aspects of the present disclosure. The example shown includes original image 300, segmented image 305, and color replaced image 310.

Original image 300 is the original image input by the user. The background crosshatching denotes a single color to be replaced based on the source color input text from the user. In an example scenario, the crosshatching represents a grey sky, as referenced in FIGS. 1 and 2.

Segmented image 305 is an intermediate image produced by a color replacement system of the present disclosure. In the example scenario of FIG. 3, the segmented image 305 is segmented into two regions; light and dark regions. The light regions have been determined to not be a target color. The dark regions have been determined to be a target color. Therefore, the dark region will be replaced with a source color. In some examples, an image segmentation mask may be presented to a user to make it more clear which portions of the image will be replaced with another color.

Color replaced image 310 is a final image produced by the color replacement system of the present disclosure. The segmented background of the image is replaced by the target color, represented by diagonal hatching.

Network Architecture

Figure 4:
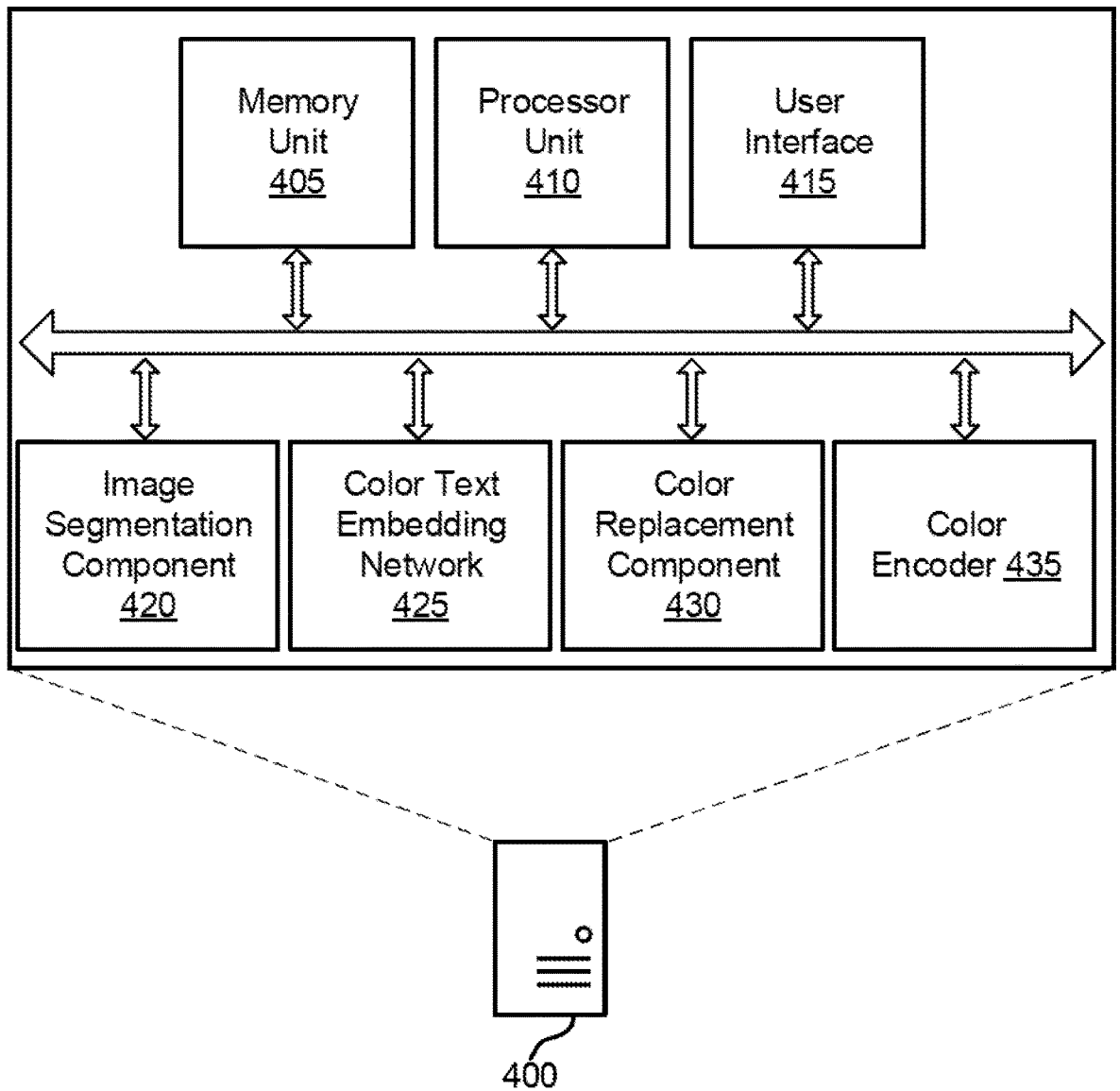
FIG. 4 shows an example of a color replacement apparatus according to aspects of the present disclosure.
Figure 5:
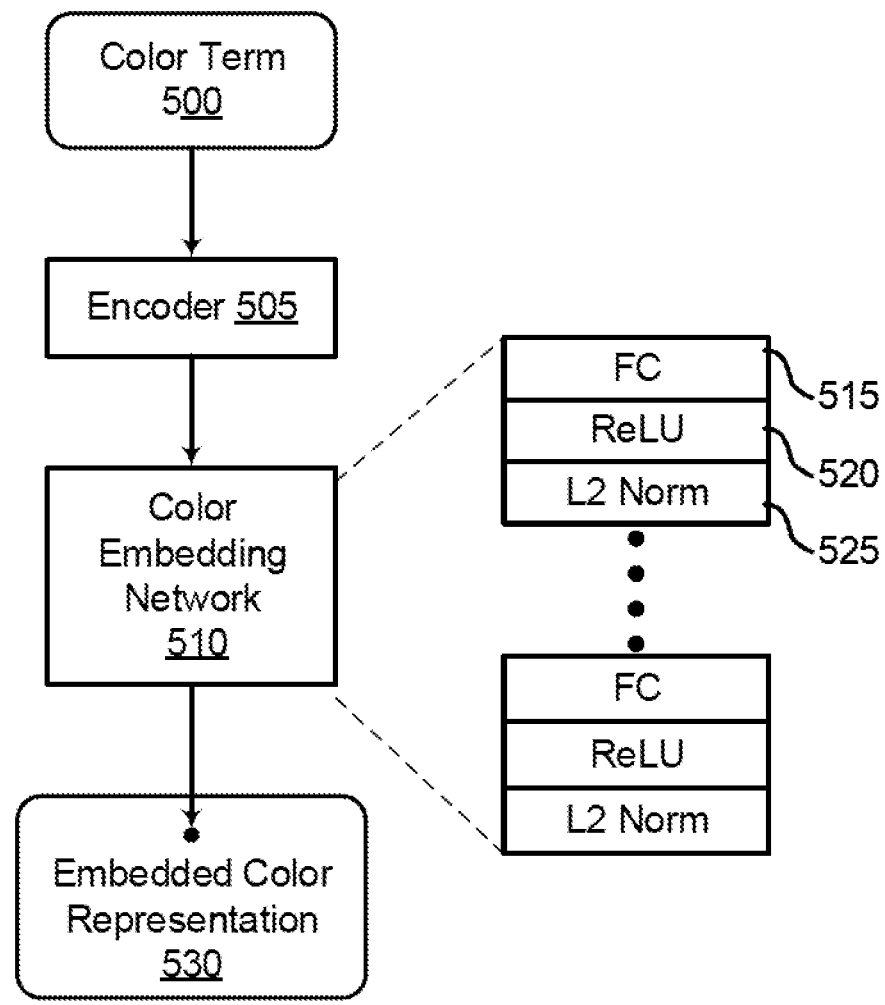
FIG. 5 shows an example of a process for color embedding according to aspects of the present disclosure.

In FIGS. 4 and 5, an apparatus, system, and method for color replacement are described. One or more embodiments of the apparatus, system, and method include an image segmentation component configured to segment an image to produce a color segmentation by comparing a source color to pixel color embeddings for a plurality of pixels in the image, a color text embedding network configured to generate a target color embedding corresponding to a target color based on a target color text input, and a color replacement component configured to replace the source color with the target color in the image based on the color segmentation and the query color embedding.

Some examples of the apparatus, system, and method described above further include a color encoder configured to generate the pixel color embeddings in a same embedding space as the target color embedding. Some examples of the apparatus, system, and method described above further include a user device configured to receive source color text input for the source color and the target color text input for the target color, and to display the image having the source color replaced with the target color.

FIG. 4 shows an example of a color replacement apparatus 400 according to aspects of the present disclosure. The example shown includes color replacement apparatus 400 with a memory unit 405, processor unit 410, user device 415, image segmentation component 420, color text embedding network 425, color replacement component 430, and color encoder 435. Color replacement apparatus 400 is an example of, or includes aspects of, the corresponding element described with reference to FIG. 1.

Examples of a memory unit 405 include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

A processor unit 410 is an intelligent hardware device, (e.g., a general-purpose processing component, a digital signal processor (DSP), a central processing unit (CPU), a graphics processing unit (GPU), a microcontroller, an application-specific integrated circuit (ASIC), a field-programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special-purpose components for modem processing, baseband processing, digital signal processing, or transmission processing.

The user device 415 may be a personal computer, laptop computer, mainframe computer, palmtop computer, personal assistant, mobile device, or any other suitable processing apparatus. User device 415 is an example of, or includes aspects of, the corresponding element described with reference to FIG. 1.

According to some embodiments, image segmentation component 420 segments an image to produce a color segmentation by comparing a source color to pixel color embeddings for a set of pixels in the image. In some examples, image segmentation component 420 identifies a set of image colors in the image. In some examples, image segmentation component 420 receives an indication from the user identifying the source color from among the colors in the image. In some examples, image segmentation component 420 identifies a set of pixel clusters in the image, and selects a pixel from each of the pixel clusters, where the set of pixels correspond to the selected pixels. In some examples, the pixel clusters are identified based on having a similar pixel color. In some examples, image segmentation component 420 updates the color segmentation based on feedback about the image segmentation, where the source color is replaced based on the updated color segmentation.

According to some embodiments, color text embedding network 425 generates a source color embedding and a target color embedding based on a source color text input and a target color text input, respectively. In some examples, the color segmentation is based on the source color embedding. In some examples, the source color or the target color is extracted from an audio signal. In some examples, color text embedding network 425 determines that the target color text input corresponds to a primary color, and identifies a set of related colors by adding or modifying text to the target color text input. For example, color text embedding network 425 can generate related color embeddings for related colors, where the target color embedding is based on the related color embeddings. Color text embedding network 425 is an example of, or includes aspects of, the corresponding element described with reference to FIG. 5.

According to some embodiments, color replacement component 430 replaces the source color with the target color in the image based on the color segmentation and the target color embedding. In some examples, color replacement component 430 replaces the hue, and then adjusts the image based on a lightness value and a saturation value.

According to some embodiments, color replacement component 430 replaces the source color with the target color in the image based on the color segmentation and the target color embedding. In some examples, color replacement component 430 identifies a hue, saturation, and lightness (HSL) color representation for the target color based on the color embedding, and then identifies a hue of the target color based on the HSL color representation. In some examples, color replacement component 430 also identifies a lightness value and a saturation value based on user input. In some examples, color replacement component 430 identifies a replacement color based on the hue of the target color, the lightness value, and the saturation value. In some examples, color replacement component 430 receives a lightness adjustment value, a saturation adjustment value, or both from a user, where the lightness value or the saturation value is based on the lightness adjustment value or the saturation adjustment value, respectively.

According to some embodiments, color encoder 435 generates the color embeddings for the pixels, and generates the pixel color embeddings in a same embedding space as the target color embedding. Color encoder 435 is an example of, or includes aspects of, the corresponding element described with reference to FIG. 5.

In some examples, color replacement apparatus 400 computes a similarity score for each of the pixels, and also identifies a similarity threshold. Then, the color replacement apparatus 400 determines whether the similarly scores for each of the pixels is less than the similarity threshold, where the color segmentation is based on the determination. In some examples, color replacement apparatus 400 computes a cosine similarity between the source color embedding and each of the pixel color embeddings, where the similarity score is based on the cosine similarity. In some examples, color replacement apparatus 400 displays a threshold control element to a user. In some examples, color replacement apparatus 400 receives a threshold control value from the threshold control element, where the similarity threshold is based on the threshold control value.

FIG. 5 shows an example of a process for color embedding according to aspects of the present disclosure. The example shown includes color term 500, encoder 505, color embedding network 510, and embedded color representation 530. According to some embodiments, encoder 505 embeds the color term 500 in a text embedding space to produce an embedded color term 500. According to some embodiments, encoder 505 may be trained to embed color terms 500 in a text embedding space to generate embedded color terms 500. In one embodiment, color embedding network 510 includes fully connected layer 515, rectified linear unit 520, and least squares function 525.

Some embodiments of the present disclosure use a multi-lingual text encoder to convert text into a color embedding. A color pixel encoder converts RGB values to color embedding used to segment regions of an image using a similarity score metric. A color pixel encoder computes the color embeddings of pixels by converting the RGB space to LAB space. The conversion is performed because two color vectors that are close to each other (i.e., low Euclidean distance, L2) in the RGB space may not be not perceptually close with respect to human color vision. LAB space is designed to be perceptually uniform with human color vision (i.e., a numerical change in LAB values corresponds to the same amount of visually perceived change). 3D histograms, used in LAB space, are computed by identifying interval combinations suitable for color similarity search to find good intervals.

For example, the interval combination of histograms of [9, 7, 8] and [10, 10, 10] sizes may be used. Two histograms are calculated using [9, 7, 8] and [10, 10, 10] intervals and concatenated to get one feature vector. The square root of numbers in the feature vector is calculated to get the final color embedding. Finding the square root may penalize the dominant color and give other colors in an image more weights. For example, RGB values are converted to the corresponding 1504 dimension color embeddings by taking RGB values individually to get 2 non-zeros values in the feature vector (i.e., one value in the color histograms of size 504 and 1000 is non-zero).

A method for a text-based image search is described. Embodiments of the method are configured to receive a text input, wherein the text input includes a color term 500. For example, the color term 500 may be 'yellow', 'fuchsia', 'greenish-blue', or the like, but the present disclosure is not limited to these colors and may decipher various color terms 500. Additionally, the color terms 500 are not limited to the English language and may be from any natural language such as Spanish, French, Italian, or the like.

Additionally, embodiments of the method are configured to generate an embedded color representation 530 for the color term 500 using an encoder 505 and a color embedding network 510. Embodiments of the method are further configured to select a color palette for the color term 500 based on the embedded color term (e.g., the color term 500 embedded into the color space via encoder 505), perform an image search based on the color palette, and return search results based on the color palette. The search results may include an image that is determined to include the color term.

According to some embodiments, encoder 505 embeds the color term 500 in a text embedding space to produce an embedded color term. The color term 500 is first converted to a cross-lingual sentence embedding using encoder 505. For example, the encoder 505 may be a cross-lingual sentence encoder. If a cross-lingual sentence encoder is not used, another sentence encoder may be used and trained with colors in different languages. According to some embodiments, encoder 505 may be trained to embed color terms 500 in a text embedding space to generate embedded color terms.

The cross-lingual sentence embeddings are sent to the color embedding network 510, which may include blocks of fully connected (FC), ReLu, and least squares layers. Least squares layers (i.e., L2 Norm) restrict the values in such a way that the values are in a range of 0-1, and are used in the last block as the color embedding values are in the range of 0-1. In some examples, a fully connected layer 515 (FC), a rectified linear unit 520 (ReLU), and a least squares function 525 (L2 Norm) may be referred to as a neural network layer. Generally, color embedding network 510 can include any number of layers (e.g., any number of groupings of fully connected layer 515, rectified linear unit 520, and least squares function 525).

A multi-lingual text encoder converts color text to a corresponding color embedding in the same space as pixel color embeddings. Datasets used consist of color texts and corresponding RGB values converted to color embeddings using the color pixel encoder. A color text is converted to a cross-lingual sentence embedding using cross-lingual sentence models (e.g., multi-lingual universal sentence encoder, USE). The cross-lingual sentence embedding is passed to blocks of fully connected piece-wise linear and weight regularization functions (e.g., rectified linear activation unit, ReLu and L2 normalization layer).

Weight regularization (e.g., L2 normalization layers) restricts the range of values (i.e., 0-1). Negative samples are collected from a minibatch using a negative mining strategy which involves obtaining color embeddings closest to the color embedding of the sample (i.e., with different color text) for which the negative sample is to be found. Hard negatives are obtained using the negative mining method. Therefore, a loss function in metric learning (e.g., metric learning loss or triplet loss) is used to get the generated color embedding close to corresponding positive color embedding (i.e., away from negative color embedding). Some embodiments of the present disclosure use cross-lingual multi-modal text to color embedding model with multiple styles of embedding.

In an example scenario, embodiments of the present disclosure convert an RGB value to a corresponding 1504 dimension color embedding, and 2 non-zeros values are determined in the feature vector because one value in both of the color histograms of size 504 and 1000 are non-zero. The embedded color representation 530 may be in LAB space. LAB space is a color representation including lightness, red, green, blue, and yellow. LAB space may be used for detecting minute changes or differences in colors.

Color Replacement

A method, apparatus, non-transitory computer readable medium, and system for color replacement are described. One or more embodiments of the method, apparatus, non-transitory computer readable medium, and system include segmenting an image to produce a color segmentation by comparing a source color to pixel color embeddings for a plurality of pixels in the image, generating a target color embedding corresponding to a target color by applying a color text embedding network to a target color text input, and replacing the source color with the target color in the image based on the color segmentation and the target color embedding.

Some examples of the method, apparatus, non-transitory computer readable medium, and system described above further include receiving a source color text input. Some examples further include applying the color text embedding network to the source color text input to produce a source color embedding, wherein the color segmentation is based on the source color embedding.

Some examples of the method, apparatus, non-transitory computer readable medium, and system described above further include identifying a plurality of image colors in the image. Some examples further include presenting the image colors to a user. Some examples further include receiving an indication from the user identifying the source color from among the colors in the image. Some examples of the method, apparatus, non-transitory computer readable medium, and system described above further include generating the color embeddings for the pixels using a color encoder.

Some examples of the method, apparatus, non-transitory computer readable medium, and system described above further include determining that the target color text input corresponds to a primary color. Some examples further include identifying a plurality of related colors by adding or modifying text to the target color text input. Some examples further include generating related color embeddings for the related colors, wherein the target color embedding is based on the related color embeddings.

Some examples of the method, apparatus, non-transitory computer readable medium, and system described above further include identifying a plurality of pixel clusters in the image. Some examples further include selecting a pixel from each of the pixel clusters, wherein the plurality of pixels correspond to the selected pixels. In some examples, the pixel clusters are identified based on having a similar pixel color.

Some examples of the method, apparatus, non-transitory computer readable medium, and system described above further include generating a source color embedding for the source color. Some examples further include computing a similarity score for each of the pixels. Some examples further include identifying a similarity threshold. Some examples further include determining whether the similarly scores for each of the pixels is less than the similarity threshold, wherein the color segmentation is based on the determination. Some examples of the method, apparatus, non-transitory computer readable medium, and system described above further include computing a cosine similarity between the source color embedding and each of the pixel color embeddings, wherein the similarity score is based on the cosine similarity.

Some examples of the method, apparatus, non-transitory computer readable medium, and system described above further include displaying a threshold control element to a user. Some examples further include receiving a threshold control value from the threshold control element, wherein the similarity threshold is based on the threshold control value.

Some examples of the method, apparatus, non-transitory computer readable medium, and system described above further include displaying the color segmentation to a user. Some examples further include receiving feedback from the user for the color segmentation. Some examples further include updating the color segmentation based on the feedback, wherein the source color is replaced based on the updated color segmentation. Some examples of the method, apparatus, non-transitory computer readable medium, and system described above further include displaying a color palette to the user based on the source color or the target color.

Some examples of the method, apparatus, non-transitory computer readable medium, and system described above further include receiving a lightness value and a saturation value. Some examples further include adjusting the image based on the lightness value and the saturation value. Some examples of the method, apparatus, non-transitory computer readable medium, and system described above further include receiving an audio signal. Some examples further include extracting the source color or the target color from the audio signal.

According to another embodiment, a method, apparatus, non-transitory computer readable medium, and system for color replacement are also described. One or more embodiments of the method, apparatus, non-transitory computer readable medium, and system include receiving an image, a source color text input identifying a source color, and a target color text input identifying a target color, generating a source color embedding for the source color based on the source color text input, generating color pixel embeddings for a plurality of pixels in the image, segmenting the image to produce a color segmentation by comparing the source color embedding to the pixel color embeddings, generating a target color embedding based on the target color text input, and replacing the source color with the target color in the image based on the color segmentation and the target color embedding.

Some examples of the method, apparatus, non-transitory computer readable medium, and system described above further include identifying an HSL color representation for the target color. Some examples further include identifying a hue of the target color based on the HSL color representation. Some examples further include identifying a lightness value and a saturation value. Some examples further include identifying a replacement color based on the hue of the target color, the lightness value, and the saturation value.

Some examples of the method, apparatus, non-transitory computer readable medium, and system described above further include receiving a lightness adjustment value, a saturation adjustment value, or both from a user, wherein the lightness value or the saturation value is based on the lightness adjustment value or the saturation adjustment value, respectively.

Figure 6:
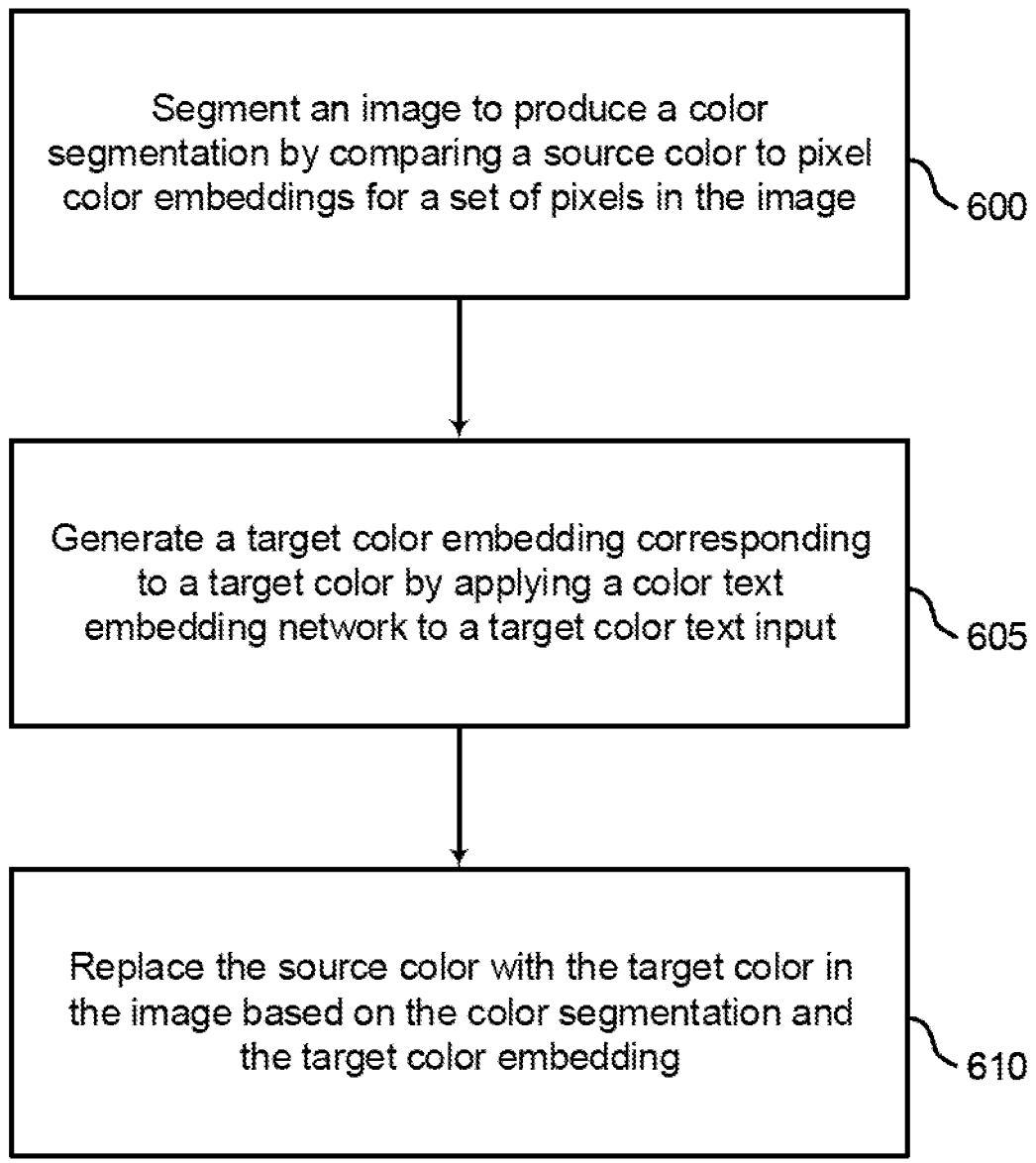
FIGS. 6 through 7 show examples of a process for color replacement according to aspects of the present disclosure.

FIG. 6 shows an example of a process for color replacement according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the system segments an image to produce a color segmentation by comparing a source color to pixel color embeddings for a set of pixels in the image. For example, a source color embedding may be generated based on source color input text, while pixel color embeddings are generated based on pixel colors. Each pixel in the image (or a sample of pixels) may be compared to the source color based on the embeddings. If the pixels are close in color to the source color, they can be included in the selected region. In some cases, the operations of this step refer to, or may be performed by, an image segmentation component as described with reference to FIG. 4.

At operation 605, the system generates a target color embedding corresponding to a target color by applying a color text embedding network to a target color text input. In some cases, the operations of this step refer to, or may be performed by, a color text embedding network as described with reference to FIGS. 4 and 5.

At operation 610, the system replaces the source color with the target color in the image based on the color segmentation and the target color embedding. For example, an embedding of the target color can be converted into an HSL format. The hue may be used to replace the hue of the pixels in the selected segment. In some cases, a user can adjust the saturation or lightness of the replaced pixels as well (e.g., using a slider provided in a user interface). In some cases, the operations of this step refer to, or may be performed by, a color replacement component as described with reference to FIG. 4.

Figure 7:
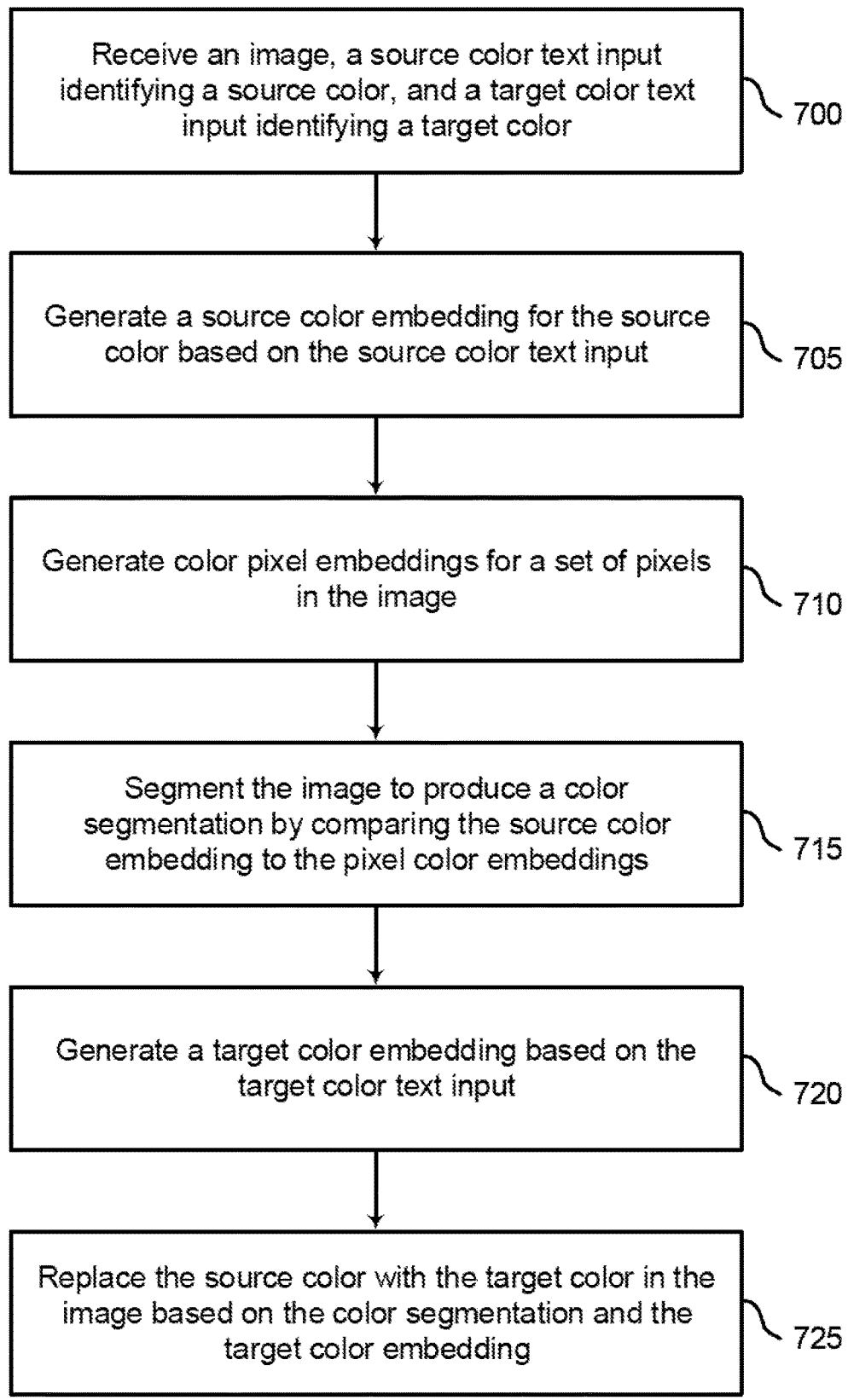

FIG. 7 shows an example of a process for color replacement according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the system receives an image, a source color text input identifying a source color, and a target color text input identifying a target color. The image may be input by a user. Alternately, the image may be stored on a database and retrieved from the database. Both the source color and target color may be input via speech and converted to text, or input as text. In some cases, the operations of this step refer to, or may be performed by, a user device as described with reference to FIGS. 1 and 4.

At operation 705, the system generates a source color embedding for the source color based on the source color text input. The color text input may be a speech-to-text input. In some cases, the operations of this step refer to, or may be performed by, a color text embedding network as described with reference to FIGS. 4 and 5.

At operation 710, the system generates color pixel embeddings for a set of pixels in the image. In some cases, the operations of this step refer to, or may be performed by, a color text embedding network as described with reference to FIGS. 4 and 5.

At operation 715, the system segments the image to produce a color segmentation by comparing the source color embedding to the pixel color embeddings. The image may be segmented into two or more segments. In some cases, the operations of this step refer to, or may be performed by, an image segmentation component as described with reference to FIG. 4.

At operation 720, the system generates a target color embedding based on the target color text input. The color text input may be a speech-to-text input. In some cases, the operations of this step refer to, or may be performed by, a color text embedding network as described with reference to FIGS. 4 and 5.

At operation 725, the system replaces the source color with the target color in the image based on the color segmentation and the target color embedding. In some cases, the operations of this step refer to, or may be performed by, a color replacement component as described with reference to FIG. 4.

Figure 8:
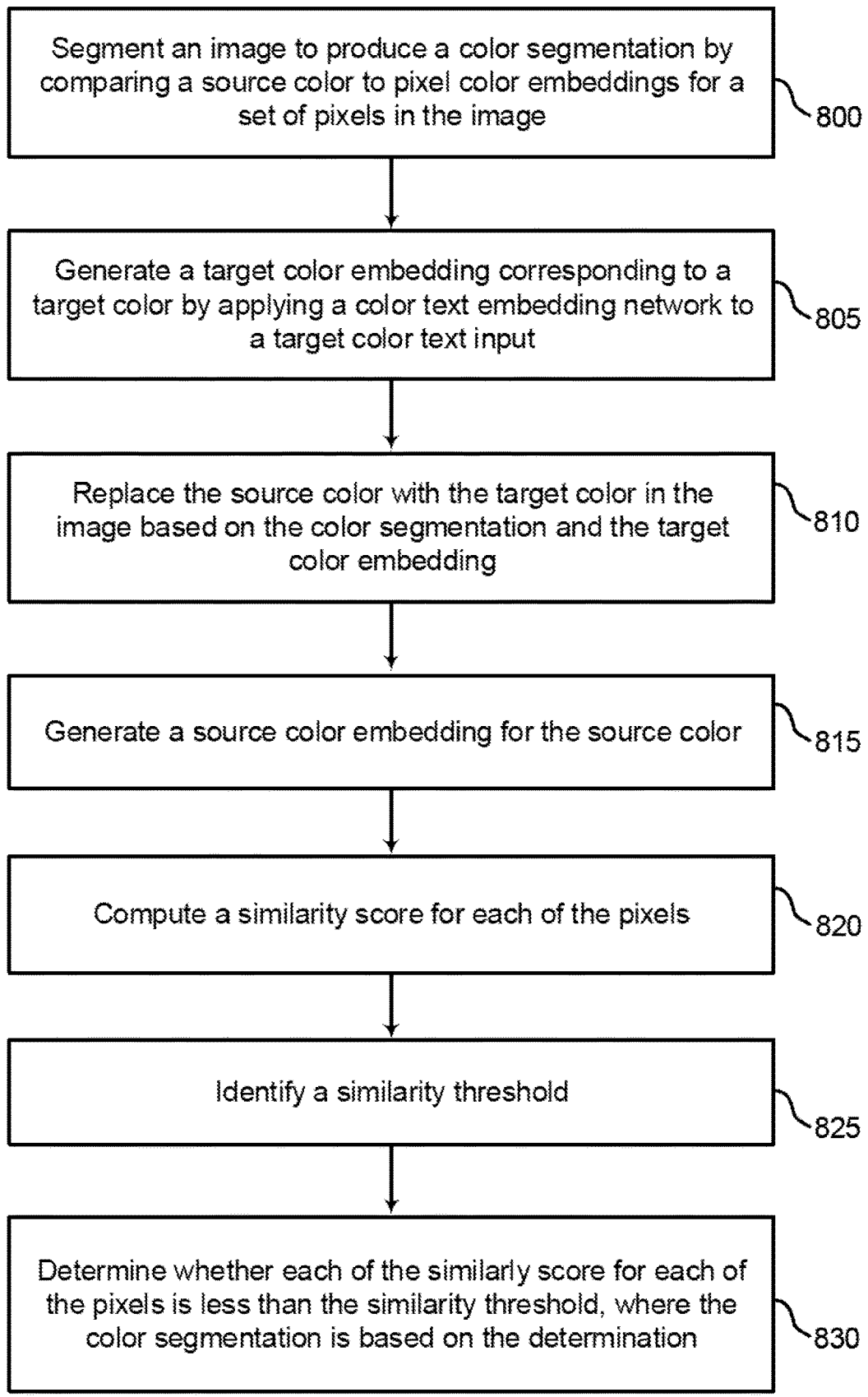
FIG. 8 shows an example of a process for color segmentation according to aspects of the present disclosure.

FIG. 8 shows an example of a process for color segmentation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

The color segmentation is performed by extracting color embeddings for the unique pixels in an image using the color pixel encoder. A user may search colors using a color auto-tagger which may recommend colors in the form of texts present in an image. A user may consider any color to segment. A color auto-tagger is created using a pre-defined list of color texts and corresponding color embeddings which may be generated using a multi-lingual text encoder. For a pixel color embedding, the closest color text is found from similarity scores using dot product or square distance (i.e., selecting the nearest). A histogram of the nearest colors is created and a user may be provided with suitable colors as tags or word cloud. A user-provided input (i.e., color) in the form of text or speech is converted to text using a speech-to-text tool and a color embedding is found using a multi-lingual text encoder.

At operation 800, the system segments an image to produce a color segmentation by comparing a source color to pixel color embeddings for a set of pixels in the image. In some cases, the operations of this step refer to, or may be performed by, an image segmentation component as described with reference to FIG. 4.

At operation 805, the system generates a target color embedding corresponding to a target color by applying a color text embedding network to a target color text input. In some cases, the operations of this step refer to, or may be performed by, a color text embedding network as described with reference to FIGS. 4 and 5.

At operation 810, the system replaces the source color with the target color in the image based on the color segmentation and the target color embedding. In some cases, the operations of this step refer to, or may be performed by, a color replacement component as described with reference to FIG. 4.

At operation 815, the system generates a source color embedding for the source color. The color text input may be a speech-to-text input. In some cases, the operations of this step refer to, or may be performed by, a color text embedding network as described with reference to FIGS. 4 and 5.

At operation 820, the system computes a similarity score for each of the pixels. Similarity scores are obtained using color embedding with pixels color embeddings. Pixel indexes are sorted in descending order of similarity scores. A threshold value (decided by moving a slider in a user device) is used to select similar pixel indexes to represent segmented portions (in original color) and the remaining pixel indexes are displayed in grayscale. The threshold value decides the variations of color text segmented or captured in an image. In some cases, the operations of this step refer to, or may be performed by, a color text embedding network as described with reference to FIGS. 4 and 5.

At operation 825, the system identifies a similarity threshold. A color pixel encoder converts RGB values to color embedding used to segment regions of an image using a similarity score metric. A color pixel encoder computes the color embeddings of pixels by converting the RGB space to LAB space. In some cases, the operations of this step refer to, or may be performed by, a color text embedding network as described with reference to FIGS. 4 and 5.

At operation 830, the system determines whether the similarly scores for each of the pixels is less than the similarity threshold, where the color segmentation is based on the determination. For a pixel color embedding, the closest color text is found from similarity scores using dot product or square distance (i.e., selecting the nearest). A histogram of the nearest colors is created, and a user may be provided with suitable colors as tags or word cloud. In some cases, the operations of this step refer to, or may be performed by, a color text embedding network as described with reference to FIGS. 4 and 5.

Figure 9:
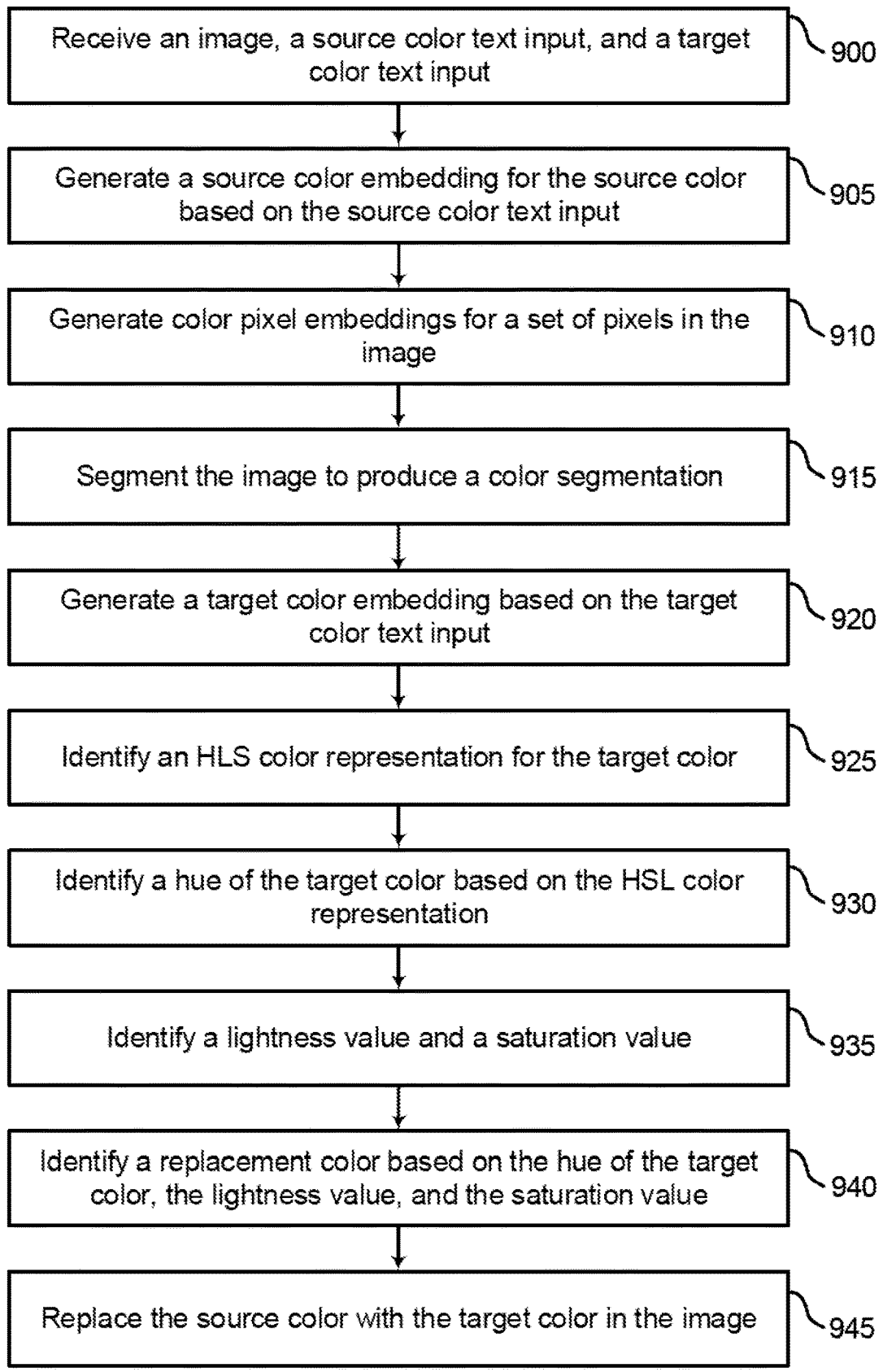
FIG. 9 shows an example of a process for color replacement according to aspects of the present disclosure.

FIG. 9 shows an example of a process for color replacement according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Color replacement includes a target color provided by a user to replace the segmented portion (i.e., source color). Color embedding is found using a multi-lingual text encoder when a target color is provided by a user. The target color embedding is mapped to the nearest RGB value by a pre-defined list of color texts used for creating a color auto-tagger. Similarity scores between given target color text. The color text is mapped with the RGB value of the closest color text in the list.

At operation 900, the system receives an image, a source color text input identifying a source color, and a target color text input identifying a target color. The image may be input by a user. Alternately, the image may be stored on a database and retrieved from the database. Both the source color and target color may be input via speech and converted to text, or input as text. In some cases, the operations of this step refer to, or may be performed by, a user device as described with reference to FIGS. 1 and 4.

At operation 905, the system generates a source color embedding for the source color based on the source color text input. The color text input may be a speech-to-text input. In some cases, the operations of this step refer to, or may be performed by, a color text embedding network as described with reference to FIGS. 4 and 5.

At operation 910, the system generates color pixel embeddings for a set of pixels in the image. In some cases, the operations of this step refer to, or may be performed by, a color text embedding network as described with reference to FIGS. 4 and 5.

At operation 915, the system segments the image to produce a color segmentation by comparing the source color embedding to the pixel color embeddings. The image may be segmented into two or more segments. In some cases, the operations of this step refer to, or may be performed by, an image segmentation component as described with reference to FIG. 4.

At operation 920, the system generates a target color embedding based on the target color text input. The color text input may be a speech-to-text input. In some cases, the operations of this step refer to, or may be performed by, a color text embedding network as described with reference to FIGS. 4 and 5.

At operation 925, the system identifies an HSL color representation for the target color. In some cases, the operations of this step refer to, or may be performed by, a color replacement component as described with reference to FIG. 4.

At operation 930, the system identifies a hue of the target color based on the HSL color representation. In some cases, the operations of this step refer to, or may be performed by, a color replacement component as described with reference to FIG. 4.

At operation 935, the system identifies a lightness value and a saturation value. In some cases, the operations of this step refer to, or may be performed by, a color replacement component as described with reference to FIG. 4.

The RGB values of the target color and pixels in the segmented portions are converted to the corresponding HSL (hue, saturation, and lightness) space. The hue values of the segmented portion pixel HSL values are replaced with the hue value of user provided color text HSL values (without changing lightness and saturation) to keep shades and color variations in a segmented region intact.

At operation 940, the system identifies a replacement color based on the hue of the target color, the lightness value, and the saturation value. In some cases, the operations of this step refer to, or may be performed by, a color replacement component as described with reference to FIG. 4.

At operation 945, the system replaces the source color with the target color in the image based on the color segmentation and the target color embedding. In some cases, the operations of this step refer to, or may be performed by, a color replacement component as described with reference to FIG. 4.

A user may use a slider to vary the lightness and saturation values. For a slider value below 0.5, the delta with respect to 0.5 is subtracted from the lightness or saturation values of pixels in the segmented regions and for a slider value above 0.5, delta is added with respect to 0.5. The HSL space is changed back to the RGB space after calculating the HSL values of the segmented portion pixels and the portion is overlapped on the original image. For example, a user provides ink blue as a target color. As the hue is replaced, if the original segmented portion is a dull shade, the replaced color will be a dull version of the color mentioned by the user. Therefore, the user may adjust the lightness and saturation values using a slider.

Increasing saturation results in the color of an object being closer to the user provided color (e.g., ink blue). Increasing the lightness of a target region increases the lightness or saturation values of a segmented pixel equally while the shades of the object are intact. A user may save the image after being satisfied with the changes of a color-segmented portion. The process may be repeated for a different color.

The tool may be more efficient and easier to use with a functionality in the user device to convert the instructions (given as speech) by a user to instructions the UI understands. For example, if a user wants to convert blue to red, the colors blue and red are recognized by the tool using a predefined color list (used to recognize colors in a sentence) or a color named entity recognition (NER) model.

Basic colors (i.e., blue, green) may be used for the purpose of color segmentation using the tool to segment shades of a color by mentioning the color shade. Therefore, for basic colors, average of the multi-lingual text color embeddings generated for shades of a color is used. For example, for the color blue, average of color embeddings of blue, dark blue and light blue is used and the new color embedding represents blue. The process may be done offline for basic colors.

A UI functionality that provides a user the ability to perform color segmentation by making bounding boxes around regions may keep some regions intact. Models such as a sematic or edge-based segmentation model may be used to get pre-segmented regions where a user get color based segmented portions. The tool is used where a color is prominent in multiple objects, but a user focuses on a certain object or region and segments the portion with that color.

In some embodiments, theme generation may be added as functionality in the tool to modify images based on a color theme. A color auto-tagger may be used to determine dominant color names in images uploaded by a user. Broader colors (e.g., basic colors or shades of basic colors) are used to segment larger portions of images. For example, three dominant color names selected as input (of different basic color categories) are used to segment and replace color portions to get theme-based results with images (e.g., vector images without complex color distributions).

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described systems and methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
generating color embeddings for a plurality of pixels of an image using a color encoder;
identifying a source color embedding corresponding to a source color within the image;
segmenting the image to produce a color segmentation by comparing the source color embedding to the pixel color embeddings, wherein the color segmentation indicates a portion of the image that corresponds to the source color;
receiving a target color input corresponding to a target color;
generating a target color embedding by applying a color text embedding network to the target color input;
identifying the target color based on the target color embedding; and
replacing the source color with the target color in the image based on the color segmentation and the target color embedding.

2. The method of claim 1, further comprising:
receiving a source color text; and
generating the source color embedding based on the source color text using the color text embedding network.

3. The method of claim 1, further comprising:
identifying a plurality of image colors in the image;
presenting the image colors to a user; and
receiving an indication from the user identifying the source color from among the image colors in the image.

4. The method of claim 1, further comprising:
identifying a color palette based on the source color embedding, wherein the color palette includes a plurality of colors related to the source color; and
displaying the color palette to a user.

5. The method of claim 1, further comprising:
determine that the target color input corresponds to a primary color;
identifying a plurality of related colors by adding modifying text to the target color input; and
generating related color embeddings for the related colors using the color text embedding network, wherein the target color embedding is based on the related color embeddings.

6. The method of claim 1, further comprising:
identifying a plurality of pixel clusters in the image; and
selecting a pixel from each of the pixel clusters, wherein the plurality of pixels correspond to the selected pixels.

7. The method of claim 6, wherein:
the pixel clusters are identified based on having a similar pixel color.

8. The method of claim 1, further comprising:
computing a similarity score for each of the pixels by comparing the source color embedding and the pixel color embeddings;
identifying a similarity threshold; and
determining whether the similarly score for each of the pixels is less than the similarity threshold, wherein the color segmentation is based on the determination.

9. The method of claim 8, further comprising:
computing a cosine similarity between the source color embedding and each of the pixel color embeddings, wherein the similarity score is based on the cosine similarity.

10. The method of claim 8, further comprising:
displaying a threshold control element to a user; and
receiving a threshold control value from the threshold control element, wherein the similarity threshold is based on the threshold control value.

11. The method of claim 1, further comprising:
displaying the color segmentation to a user;
receiving feedback from the user for the color segmentation; and
updating the color segmentation based on the feedback.

12. The method of claim 11, further comprising:
receiving a lightness value and a saturation value; and
adjusting the image based on the lightness value and the saturation value.

13. The method of claim 1, further comprising:
receiving an audio signal; and
extracting the source color or the target color from the audio signal.

14. A method comprising:
receiving an image, a source color input identifying a source color, and a target color input identifying a target color;
generating a source color embedding for the source color based on the source color input;
generating color pixel embeddings for a plurality of pixels in the image;
segmenting the image to produce a color segmentation by comparing the source color embedding to the pixel color embeddings;
generating a target color embedding based on the target color input;
identifying a target color representation for the target color; and
replacing the source color with the target color in the image based on the color segmentation and the target color representation.

15. The method of claim 14, further comprising:
identifying a hue of the target color based on the target color representation, wherein the target color representation comprises an HSL representation;
identifying a lightness value and a saturation value; and
identifying a replacement color based on the hue of the target color, the lightness value, and the saturation value.

16. The method of claim 15, further comprising:
receiving a lightness adjustment value, a saturation adjustment value, or both from a user, wherein the lightness value or the saturation value is based on the lightness adjustment value or the saturation adjustment value, respectively.

17. The method of claim 14, further comprising:
computing a LAB space color representation for each of the plurality of pixels, wherein the color pixel embeddings are based on the LAB space representation.

18. An apparatus comprising:
a color text embedding network configured to generate a source color embedding based on a source color input and a target color embedding based on a target color input;
a color encoder configured to generate pixel color embeddings for a plurality of pixels in an image;
an image segmentation component configured to segment the image to produce a color segmentation by comparing the source color embedding to the pixel color embeddings; and
a color replacement component configured to replace the source color with the target color in the image based on the color segmentation and the target color embedding.

19. The apparatus of claim 18, further comprising:
an audio converter configured to convert voice input into the source color input or the target color input.

20. The apparatus of claim 18, further comprising:
a user interface configured to receive source color input for the source color and the target color input for the target color, and to display the image having the source color replaced with the target color.

* * * * *